United States Patent [19]

Camph

[11] Patent Number: 4,518,063
[45] Date of Patent: May 21, 1985

[54] AUTOMATIC SLACK ADJUSTER

[76] Inventor: Sven E. Camph, Flygarevägen 9 F, S-236 00 Höllviksnäs, Sweden

[21] Appl. No.: 640,253

[22] Filed: Aug. 14, 1984

Related U.S. Application Data

[63] Continuation of Ser. No. 388,161, Jun. 14, 1982, abandoned.

[51] Int. Cl.³ .............................................. F16D 65/56
[52] U.S. Cl. ..................... 188/196 BA; 188/79.5 GE; 188/330; 192/78; 192/111 A
[58] Field of Search ............... 188/79.5 R, 79.5 GE, 188/329, 330, 332, 338, 339, 196 BA; 192/78, 111 A

[56] References Cited

U.S. PATENT DOCUMENTS

| | | | |
|---|---|---|---|
| 1,834,530 | 12/1931 | Lyman | 188/196 BA |
| 2,522,903 | 9/1950 | Shively | 188/196 BA X |
| 3,891,068 | 6/1975 | Camph | 188/196 BA |

Primary Examiner—George E. A. Halvosa
Attorney, Agent, or Firm—Laurence R. Brown

[57] ABSTRACT

An automatic slack adjuster having compression force transmitting elements of adjustable length mounted between a key and a pair of brake shoes is provided with a wheel journalled on the key shaft and at one side in tooth engagement with parts of the force transmitting elements. On the other side of the wheel a spring latch rigidly mounted to the key shaft is arranged to contact ridges and grooves on the wheel to establish a one-way clutch.

1 Claim, 10 Drawing Figures

AUTOMATIC SLACK ADJUSTER

This is a continuation of application Ser. No. 388,161, filed June 14, 1982, now abandoned.

BACKGROUND OF THE INVENTION

1. Field of the Invention

This invention relates to an automatic slack adjuster for a vehicle drum brake of the type actuated by a key rigidly mounted on a key shaft connected to a cylinder-piston activator. The said key is acting upon a pair of brake shoes through force transmitting devices each of which comprising two telescopically displaceable elements, one being an externally threaded rod, while the other is an internally threaded sleeve receiving said rod. Each of the two sleeves of the two elements is provided with a circumferential tooth rack engaging grooves extending radially on an axial shoulder surface of a wheel journalled on the key shaft, the grooves having such shape that any straight radial movements of the tooth rack relative the wheel would cause a torque on both sleeves in the direction causing increase of the total length of the two telescopically displaceable elements.

2. Description of the Prior Art

The U.S. Pat. Nos. 3,891,068 and 4,161,999 show slack adjusters of this and similar types.

Slack adjusters of the actual type should be extremely slow acting i.e. the adjustment performed per braking cycle should be very small. Otherwise there will be a substantial risk of false adjustments performed partly because of increased slack during short time intervals caused by heating the brake drum. If the automatic adjustment is sufficiently slow almost no adjustment is carried out during several subsequent braking operations performed with hot braking drums.

However, if the automatic adjustment is set to be extremely slow it will be almost impossible to check that a correct slack will be obtained because of the very large number of braking cycles required for this purpose. Therfore, it will be necessary to rely on the accuracy of the installation and the elements of the slack adjuster.

As a rule the slack adjustment may be initiated either because of excessive movements of certain brake force transmitting elements relative a stationary part of the brake or it may be initiated due to excessive relative movements of two force transmitting elements.

In the first of these two cases it is evident that false mounting of the stationary part or a subsequent displacement of said part will cause errors in the slack. In the latter of the two cases—the group to which the present invention belongs—the achievement of the correct slack is dependent on a correct installation as any deviation from movements in the correct planes and angles will cause deviations from the desired slack. It is almost impossible to check this when mounting the slack adjuster.

OBJECT OF THE INVENTION

The object of the present invention is to provide a slack adjuster of the type referred to above in which the parts determinating the slack adjustment practically cannot be displaced either during mounting nor afterwards. This will make it possible to rely on obtaining correct slack without verifying on the spot.

SUMMARY OF THE INVENTION

According to the present invention the slack adjuster of the type referred to is characterised in that the said wheel is provided with a second axially extending shoulder surface area having radially directed grooves and ridges adapted to receive a resilient spring latch rigidly connected to the key shaft.

The invention will be described in more detail reference being made to the accompanying drawings.

DESCRIPTION OF THE PREFERRED EMBODIMENTS

Figure 1:
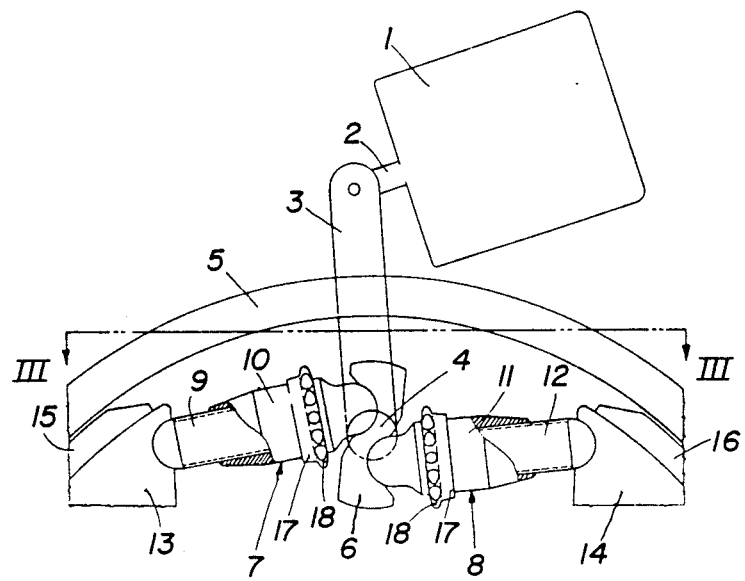
FIG. 1 schematically shows the brake force transmitting parts of a brake to be provided with a slack adjuster according to the invention.

The brake shown in FIG. 1 comprises a cylinder-piston activator 1 having a piston rod 2 which at its outer end is pivotally connected to a lever 3 rigidly connected to a key shaft 4 protruding into a brake drum 5 rigidly connected to a wheel (not shown). The key shaft 4 carries a key 6 having concave depressions adapted to receive convex end surfaces of force transmitting elements 7, 8 each of which comprising two telescopically displaceable elements 9, 10 and 11, 12 respectively. Said devices 7, 8 act upon brake shoes 13, 14 provided with linings 15 and 16 respectively. FIG. 1 shows the parts of the brake when in their released brake positions leaving gaps between the linings 15, 16 and the inner surface of the drum 5.

Figure 2:
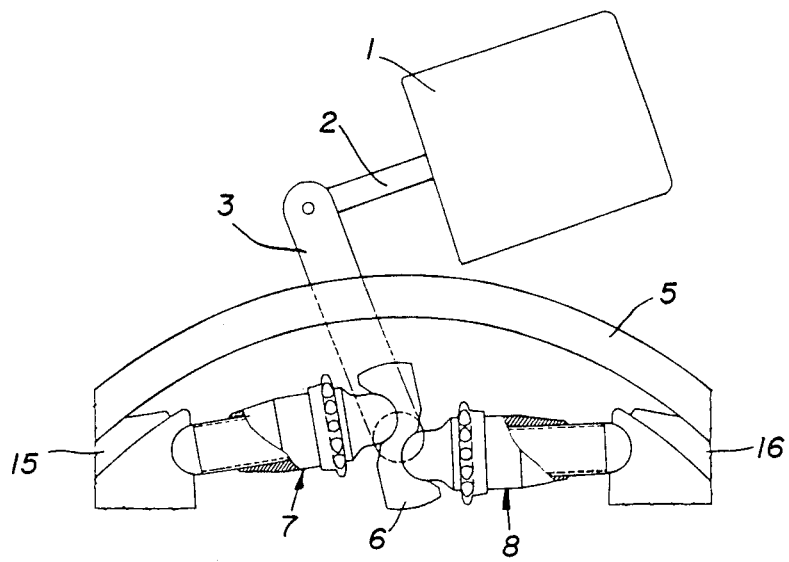
FIG. 2 the brake of FIG. 1 with the brake force transmitting parts in a different position.

A braking cycle is initiated by supplying compressed air to the activator 1. This will cause the rod 2 to be expelled and turn the key shaft 4 and the key 6 in such direction as to cause such movement of the devices 7, 8 that the brake shoes will reach contact with their linings 15, 16 against the drum 5. This position is shown in FIG. 2.

It will be understood that wear on the linings 15, 16 and the drum 5 inherently may have a detrimental influence on the brake as it may cause a substantial change in the force transmitted and in the time necessary for obtaining application of the brake.

However, if it is possible to increase the length of the devices 7, 8 corresponding to the wear of the braking surfaces the brake will maintain its braking properties. This possibility is realised by an automatic angular displacement of the elements 9, 10 and 11, 12 respectively.

The elements 10 and 11 are interiorly threaded sleeves adapted to receive the correspondingly threaded elements 9 and 12 which are prevented from rotation by means not shown. Each of the two sleeves 10, 11 are provided with a circumferential tooth rack 17 carrying a number of teeth 18.

Figure 3:
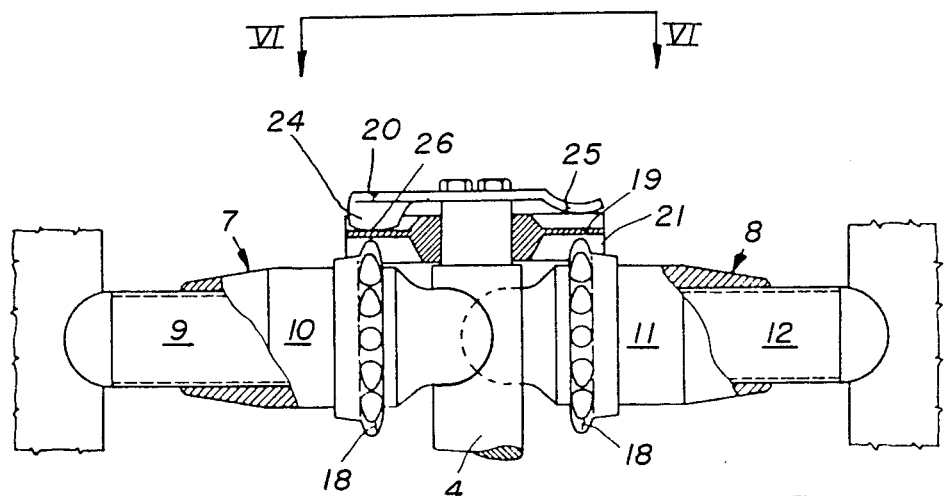
FIG. 3 a section along the line III—III of FIG. 1 showing additional parts of the automatic slack adjuster according to the invention.
Figure 4:
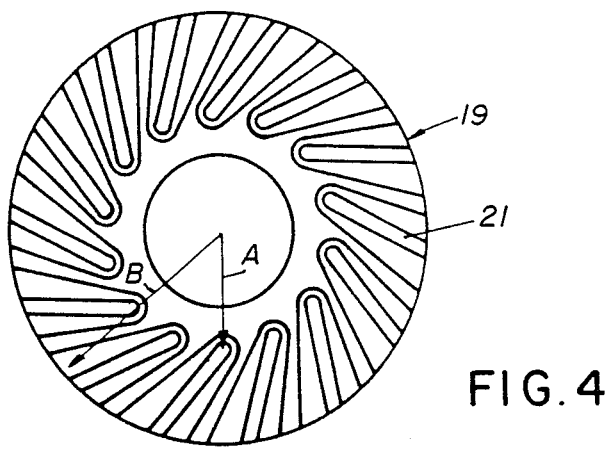
FIG. 4 at a greater scale one side of a wheel forming an element of the adjuster.
Figure 5:
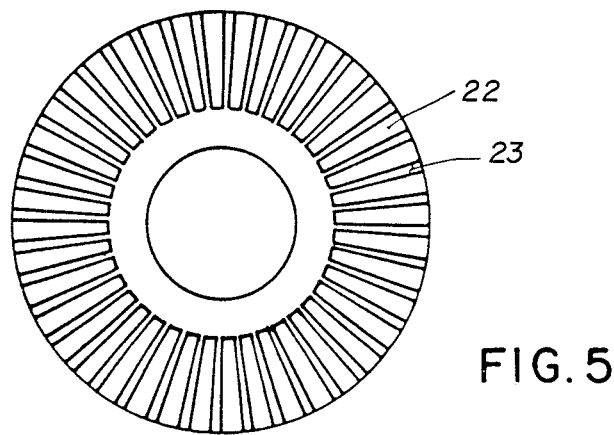
FIG. 5 the other side of the wheel shown in FIG. 4.
Figure 6:
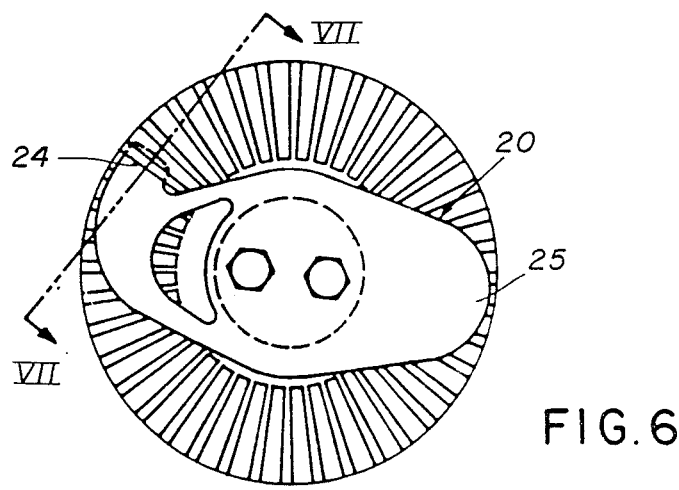
FIG. 6 shows a view along line VI—VI of FIG. 3 which includes the wheel of FIG. 5 together with the collaborating latch shown in FIG. 7.

FIG. 3 shows a section along the line III—III of FIG. 1, but in FIG. 3 the key 6 has been omitted. However, FIG. 3 shows two further items not being shown in FIGS. 1 and 2. One of said items is a wheel 19 freely journalled on an extention of the shaft 4. The other item is a resilient spring latch 20 rigidly connected to the outer end surface of the shaft 4. The spring latch 20 urges the wheel 19 in the direction away from the end of the shaft 4. The wheel 19 is at its lower side (which is shown in FIG. 4) provided with inclined grooves 21 extending between radii A and B and adapted to receive at least one tooth 18. On its opposite surface—shown in FIG. 5—the wheel 19 is provided with radially directed grooves 22 and ridges 23. The grooves 22 are adapted to receive a part 24 of the spring latch 20. FIG. 6 shows a view along the line VI—VI of FIG. 3 but to the same scale as the one used in FIGS. 4 and 5.

An end 25 of the spring opposite the part 24 slides against the tops of the ridges 23 and thus balance the spring load on the wheel 19 caused by the part 24.

Figure 7:
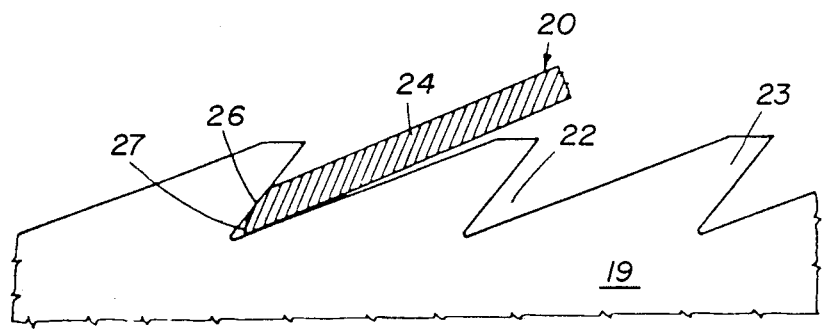
FIG. 7 at a greater scale a section along the line VII—VII of FIG. 6.

The relative influence of the spring latch 20 and the wheel 19 is illustrated in FIG. 7. It will be understood that relative angular movements greater than the angular distance between two ridges 23 will cause the part 24 of the spring latch 20 to enter into a neighboring groove 22. Only relative movements in one direction are possible. Forces of the spring latch part 24 in the direction towards the left in FIG. 7 will cause contact between the surface of a ridge side and a surface 26 of the part 24. This surface 26 will not be substantially worn, because of its rather great area. An edge 27 of the part 24 is determining the situation when the part 24 shall enter into a neighboring groove 22. This edge 27 is protected against wear during the movement of the wheel 19 caused by the latch 20.

The function of the device described is as follows:

During application of the brake the force transmitting devices 7, 8 are moved outwardly relative the axis of the key shaft 4 thus causing the braking surfaces to engage each other. During said outward movement at least one tooth 18 of each device 7, 8 is sliding radially in a groove 21 of the wheel 19.

It will be understood that due to the inclined shape of the grooves 21 radial oppositely movements of the two teeth 18 of the devices 7, 8 will cause a rotary movement of the wheel 19. However, the turning of the key 6 will also cause a rotary movement of the devices 7, 8 in the same plane and in the same direction. Therefore, the actual rotation of the wheel 19 relative a stationary part—e.g. a not-shown backing plate in which the shaft 4 is journalled—will be smaller. Also the rotation of the key shaft 4 and thus the rotation of the spring latch 20 rigidly secured thereto will be performed in the same direction. However, due to the shape of the grooves 21 a slight relative rotation will be performed between the wheel 19 and the spring latch 20 and said relative rotation is a function of the angular travel of the key shaft 4.

At excessive angular movements of the key shaft 4 the said relative movement is sufficient to cause the spring latch part 24 to enter into a neighboring groove 22 of the wheel 19. Upon release of the brake the key shaft 4 is moved in the opposite direction and the latch part 24 will cause a torque on the wheel 19 and thus on the tooth carrying elements 10, 11 relative the elements 9, 12 so as to increase the total lengths of the devices 7, 8.

Due to symmetric design of the elements conveying slack adjustments and due to the lack of stationary reference elements deciding the adjustment the described device may be made extremely accurate and the proper function will be ensured even in case of greater variations of the geometry of the brake causing leverage variations due to tolerances in the manufacture of the force transmitting parts.

Figure 8:
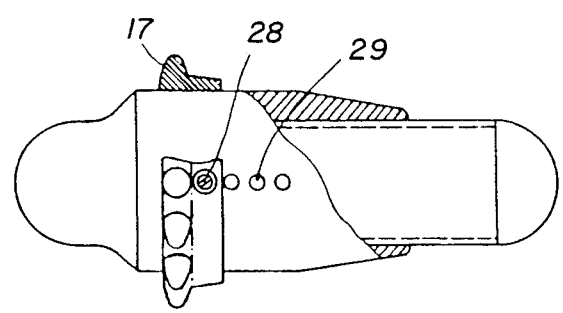
FIG. 8 a force transmitting element of the type in FIGS. 1, 2 and 3 but at a larger scale and partly in section.

The same parts such as the devices 7, 8, the wheel 19 and the spring latch 20 may even be used for brakes of varying types having keys 6 of different size and shape. This is possible by making the tooth rack 17 axially adjustable relative the elements 10 and 11. As shown in FIG. 8 this is done by loosening a set screw 28 axially displacing the rack 17 to its desired position and mounting the set screw 28 in the appropriate one of a number of holes 29.

Figure 9:
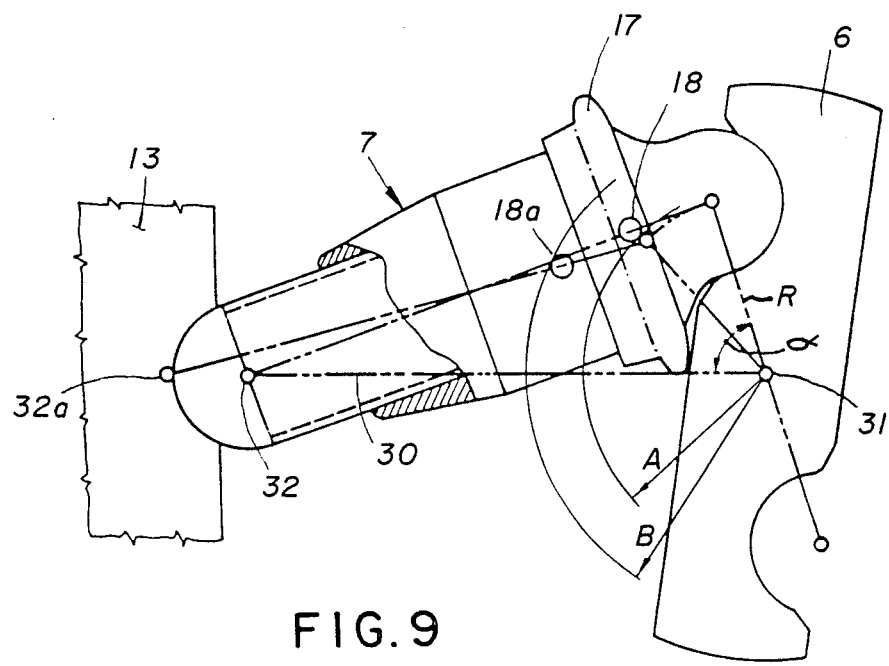
FIGS. 9 and 10 show diagrams illustrating how an amendment of the element shown in FIG. 8 can make it suitable for different types of brakes.
Figure 10:
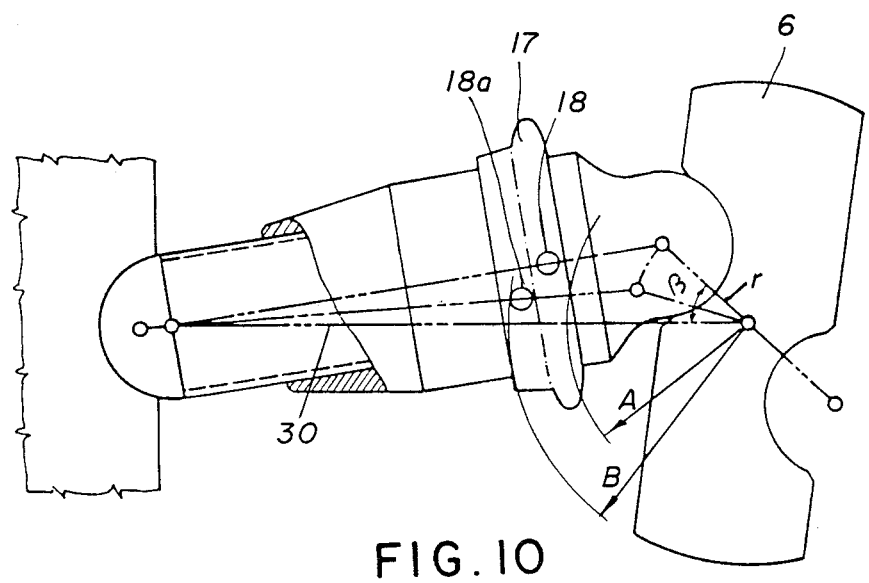

FIGS. 9 and 10 show two different keys 6. The key 6 of FIG. 9 having a rather great active length and a larger angle α between the active radius R and an imaginary line 30 connecting the axis 31 of the key shaft 4 with the axis 32 of rotation of the device 7 relative the brake shoe 13. The key 6 of FIG. 10 is shorter and has a smaller angle β between the active radius r and the imaginary line 30.

In FIG. 9 the displaceable rack 17 is in its extreme end position and during a braking operation a tooth 18 will move to a final position 18a while the axis 32 will move to the position 32a. The radial distances of the tooth positions 18 and 18a from the axis 31 determine the radial path of the teeth in the grooves 21 of the wheel 19 (not shown in FIG. 9).

FIG. 10 shows how the displaceable rack 17 makes it possible to use the same wheel 19 having the same grooves 21 also for a brake having the smaller angle β and the shorter active radius r. It will be understood that the displaceable rack 17 in FIG. 10 has been displaced so that a tooth end position 18a is located near the outer end of the grooves 21, whereas the start position 18 is between the ends of the grooves 21. It will also be understood that the position of the rack 17 shown in FIG. 9 would not be suitable for a brake having the key of FIG. 10. In such case the wheel 19 would have insufficient diameter.

What is claimed is:

1. An automatic slack adjuster for a vehicle drum brake (5) that need not be referenced to a stationary connection on the vehicle of the type actuated by a key (6) rigidly mounted on a key shaft (4) connected to a cylinder-piston activator (1), said key acting upon a pair of brake shoes (13, 14) through force transmitting devices (7, 8) each comprising two telescopically displaceable elements (9, 10, 11, 12), one being an externally threaded rod, while the other is an internally threaded sleeve receiving said rod, each of the two sleeves of the two elements being provided with a circumferential tooth rack axially adjustable along both said telescopically displaceable elements for adjusting brakes in systems having keys of different size comprising, a spring latch (20) having a dog (24) secured to the key shaft (4), a freely journalled wheel (19) mounted on one end of said key shaft and having teeth and grooves on a first shoulder surface area of one side thereof engageable with the dog (24) of said spring latch (20) and engageable on the other side with a second shoulder surface area with said circumferential tooth racks (18, 19) on said telescopically displaceable elements (7, 8) so that any straight radial movement of the tooth racks relative to said wheel (19) would cause a torque on both sleeves in the direction causing increase of the total length of the said telescopically displaceable elements, said telescopically displaceable elements having symmetric design permitting telescopic rotation in opposite directions and slack adjusting means preventing rotation of said wheel (19) relative to the key in one direction of rotation to thereby effect a torque to cause both the telescopically displaceable elements (7, 8) to increase in length together as the key (4) and wheel (10) rotate together in a direction opposite to said one direction of rotation, and wherein the means for preventing rotation of said wheel (19) includes said resilient spring latch (20), said grooves being of such shape as to permit the dog (24) to ride over one groove and enter neighboring grooves only in one direction of rotation of the shaft (4) when the brakes are applied and to cause a torque tending to turn the wheel (19) in the opposite direction of rotation of the shaft (4) when the brakes are released.

* * * * *